United States Patent
Hiroi (10) Patent No.: US 10,688,913 B2
(45) Date of Patent: Jun. 23, 2020

(54) LIGHT INTENSITY ADJUSTMENT APPARATUS, LIGHT INTENSITY ADJUSTMENT METHOD, AND COMPUTER READABLE MEDIUM

(71) Applicant: Mitsubishi Electric Corporation, Tokyo (JP)

(72) Inventor: Kimihiko Hiroi, Tokyo (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 0 days.

(21) Appl. No.: 16/481,015

(22) PCT Filed: Mar. 15, 2017

(86) PCT No.: PCT/JP2017/010458
§ 371 (c)(1),
(2) Date: Jul. 25, 2019

(87) PCT Pub. No.: WO2018/167879
PCT Pub. Date: Sep. 20, 2018

(65) Prior Publication Data
US 2020/0001777 A1  Jan. 2, 2020

(51) Int. Cl.
*B60Q 1/14* (2006.01)

(52) U.S. Cl.
CPC .................. *B60Q 1/1423* (2013.01)

(58) Field of Classification Search
CPC ...... B60Q 1/14; B60Q 1/1423; B60Q 1/0023; H05B 45/00; H05B 45/10; H05B 47/11; H05B 47/105; Y02B 20/46
See application file for complete search history.

(56) References Cited

U.S. PATENT DOCUMENTS

| | | | | |
|---|---|---|---|---|
| 7,965,871 B2 * | 6/2011 | Ihara | .................. | B60W 40/109 348/144 |
| 8,600,656 B2 * | 12/2013 | Mimeault | ............. | G01S 17/931 701/301 |
| 9,401,028 B2 * | 7/2016 | Kuehnle | ............ | G06K 9/00798 |
| 9,637,046 B2 * | 5/2017 | Ehlgen | .................. | B60Q 1/143 |

(Continued)

FOREIGN PATENT DOCUMENTS

| JP | H07-108873 A | 4/1995 |
|---|---|---|
| JP | 2004-189114 A | 7/2004 |

(Continued)

OTHER PUBLICATIONS

International Search Report for PCT/JP2017/010458 (PCT/ISA/210) dated Jun. 6, 2017, with English translation.

*Primary Examiner* — Haissa Philogene
(74) *Attorney, Agent, or Firm* — Birch, Stewart, Kolasch & Birch, LLP (57) ABSTRACT

A visibility evaluation unit of a light intensity adjustment apparatus calculates, for a detected object ahead of a moving body detected by a non-visible light sensor such as a laser range sensor, a visibility evaluation value resulting from evaluation of visibility, based on image data obtained by a visible light sensor such as a camera. A light intensity adjustment unit of the light intensity adjustment apparatus adjusts the light intensity of headlights for illuminating an area in which the detected object is present in accordance with the calculated visibility evaluation value.

9 Claims, 9 Drawing Sheets

(56) References Cited

U.S. PATENT DOCUMENTS

| | | | |
|---|---|---|---|
| 10,421,389 B2* | 9/2019 | Nagata | G06K 9/00805 |
| 2008/0129541 A1* | 6/2008 | Lu | G06K 9/00791 |
| | | | 340/905 |
| 2008/0130302 A1 | 6/2008 | Watanabe | |
| 2010/0177849 A1 | 7/2010 | Suehiro | |
| 2011/0068910 A1 | 3/2011 | Iwai et al. | |
| 2018/0186278 A1* | 7/2018 | Song | B60Q 1/085 |

FOREIGN PATENT DOCUMENTS

| | | |
|---|---|---|
| JP | 2008-137516 A | 6/2008 |
| JP | 2009-010754 A | 1/2009 |
| JP | 2010-018165 A | 1/2010 |
| JP | 2013-119357 A | 6/2013 |
| JP | 2013-193644 A | 6/2013 |
| JP | 2014-231301 A | 12/2014 |

\* cited by examiner

LIGHT INTENSITY ADJUSTMENT APPARATUS, LIGHT INTENSITY ADJUSTMENT METHOD, AND COMPUTER READABLE MEDIUM

TECHNICAL FIELD

The present invention relates to a technique for adjusting the light intensity of a headlight of a vehicle.

BACKGROUND ART

There is variable light distribution control (Adaptive Driving Beam) which, when a high beam is emitted, controls a cut-off line which is a boundary between the high beam and a low beam based on the position of another vehicle recognized using a sensor such as a camera. This variable light distribution control makes it possible to continue emitting the high beam to an area excluding the other vehicle, while performing light-blocking for the other vehicle. Then, the visibility of the driver can be improved, while preventing the other vehicle's driver from being dazzled.

The variable light distribution control uses an array light source in which a plurality of light sources, such as LED light sources, capable of independently controlling the low beam and the high beam are disposed. The light distribution is changed by controlling the lighting of each light source of the array light source. The variable light distribution control includes a configuration in which the light distribution is changed by changing a portion of the high beam to the low beam using a shutter or the like.

Patent Literature 1 describes that the headlight and tail lamp of a vehicle are recognized based on image data acquired using a camera, and areas corresponding to the headlight and the tail lamp are identified, so as to control the light distribution.

Patent Literature 2 describes that when the steering angle is equal to or more than a predetermined steering angle, a change in the vehicle's angle is predicted, and an area corresponding to an oncoming vehicle is identified, so as to control the light distribution.

CITATION LIST

Patent Literature

Patent Literature 1: JP 7-108873 A
Patent Literature 2: JP 2008-137516 A

SUMMARY OF INVENTION

Technical Problem

Patent Literature 1 and Patent Literature 2 aim to prevent the driver of a nearby vehicle from being dazzled. In Patent Literature 1 and Patent Literature 2, the high beam is emitted to objects other than vehicles. Therefore, there may be a case where the visibility of an object in front is reduced. For example, in a case where the high beam is emitted to an object in close proximity, and in a case where the high beam is emitted simultaneously with another vehicle to the same object, luminance saturation occurs and the visibility of the object is reduced.

It is an object of the present invention to prevent the visibility of an object present ahead of a moving body from being reduced.

Solution to Problem

A light intensity adjustment apparatus according to the present invention includes:
a visibility evaluation unit to calculate, for a detected object ahead of a moving body detected by a non-visible light sensor, a visibility evaluation value resulting from evaluation of visibility, based on image data obtained by a visible light sensor; and
a light intensity adjustment unit to adjust a light intensity of a headlight of the moving body for illuminating an area in which the detected object is present, in accordance with the visibility evaluation value calculated by the visibility evaluation unit.

Advantageous Effects of Invention

In the present invention, a visibility evaluation value is calculated for a detected object detected by a non-visible light sensor, and the light intensity of a headlight for illuminating an area in which the detected object is present is adjusted. In this way, the visibility of an object present ahead of a moving body can be prevented from being reduced.

DESCRIPTION OF EMBODIMENTS

First Embodiment

Description of Configuration

A configuration of a light intensity adjustment apparatus 10 according to a first embodiment will be described with reference to FIG. 1.

Figure 1:
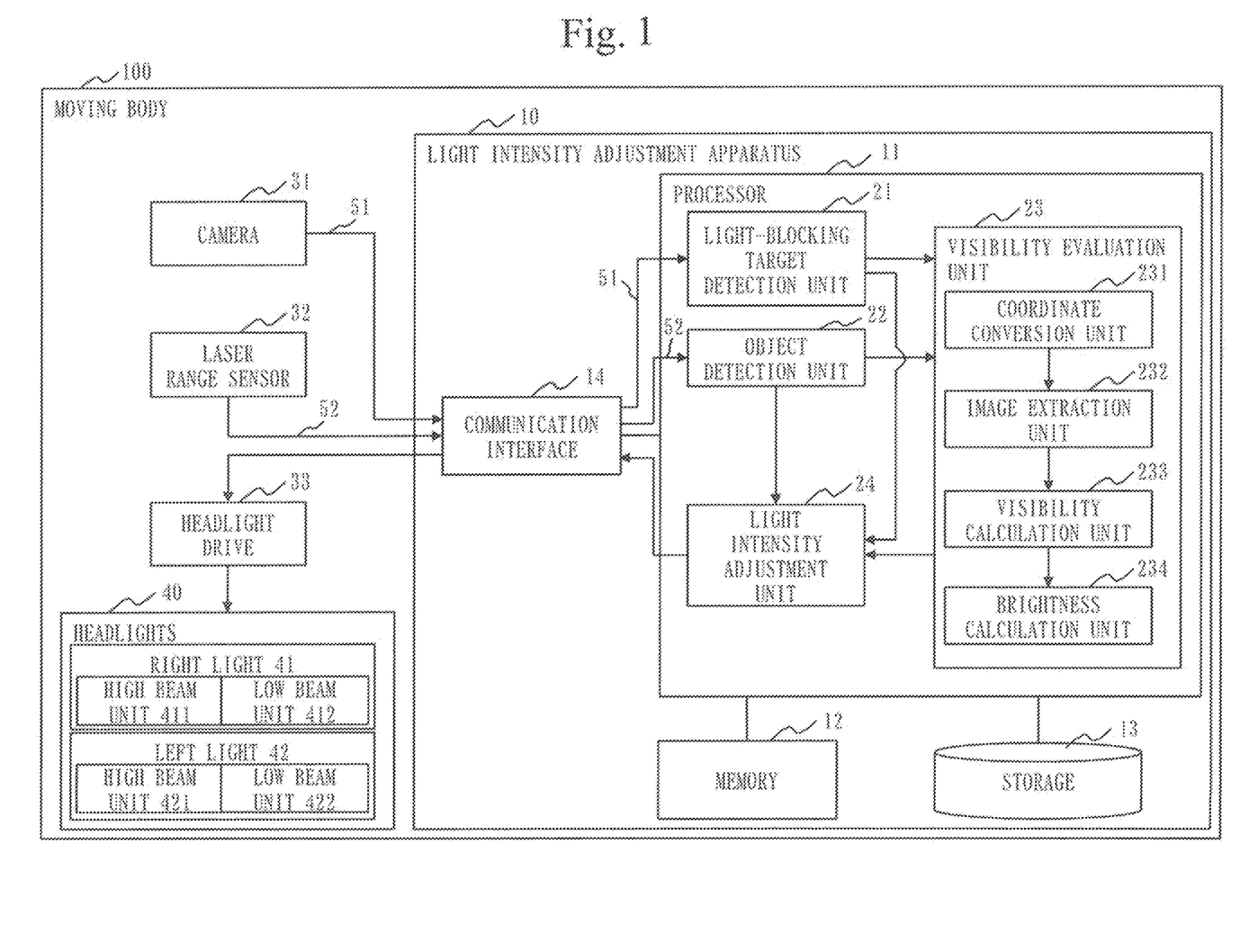
FIG. 1 is a configuration diagram of a light intensity adjustment apparatus 10 according to a first embodiment.

FIG. 1 illustrates a state in which the light intensity adjustment apparatus 10 is mounted on a moving body 101. In the first embodiment, the moving body 101 is a vehicle 100. However, the moving body 101 may be other than the vehicle 100 and may be a ship or the like.

The light intensity adjustment apparatus 10 may be implemented in a form integrated with or in a form inseparable from the vehicle 100 or another component illustrated in the diagram. Alternatively, the light intensity adjustment apparatus 10 may be implemented in a form detachable from or in a form separable from the vehicle 100 or another component illustrated in the diagram.

The light intensity adjustment apparatus 10 is a computer.

The light intensity adjustment apparatus 10 has a processor 11, a memory 12, a storage 13, and a communication interface 14. The processor 11 is connected with other hardware components via signal lines and controls these other hardware components.

The processor 11 is an integrated circuit (IC) that performs arithmetic processing. As a specific example, the processor 11 is a central processing unit (CPU), a digital signal processor (DSP), or a graphics processing unit (GPU).

The memory 12 is a storage device to temporarily store data. As a specific example, the memory 12 is a static random access memory (SRAM) or a dynamic random access memory (DRAM).

The storage 13 is a storage device to store data. As a specific example, the storage 13 is a ROM, a flash memory, or a hard disk drive (HDD). Alternatively, the storage 13 may be a portable storage medium, such as a Secure Digital (SD, registered trademark) memory card, CompactFlash (CF), NAND flash, a flexible disc, an optical disc, a compact disc, a Blu-ray (registered trademark) disc, or a digital versatile disc (DVD).

The communication interface 14 is an interface for communication with an external device. As a specific example, the communication interface 14 is a port of Ethernet (registered trademark), a Controller Area Network (CAN), RS232C, or Universal Serial Bus (USB).

In FIG. 1, the communication interface 14 is connected with a camera 31 which is a visible light sensor, a laser range sensor 32 which is a non-visible light sensor, and a headlight drive 33.

The camera 31 is mounted on the vehicle 100 such that the camera 31 faces a forward direction of the vehicle 100. The camera 31 is a device that acquires image data ahead of the vehicle 100. In FIG. 1, only one camera 31 is illustrated. However, the vehicle 100 may have a plurality of cameras 31.

The laser range sensor 32 is mounted on the vehicle 100 such that light is emitted in the forward direction of the vehicle 100. The laser range sensor 32 is a device that detects an object present ahead of the vehicle 100 by emitting light in the forward direction of the vehicle 100. The laser range sensor 32 can also detect the distance to an object by receiving a reflected wave from the object.

The headlight drive 33 is a device that controls headlights 40 mounted on the vehicle 100.

The headlights 40 include a right light 41 and a left light 42. The right light 41 includes a high beam unit 411 and a low beam unit 412. The left light 42 includes a high beam unit 421 and a low beam unit 422. Each of the high beam unit 411 and the high beam unit 421 is an array light source in which a plurality of light sources, such as LED light sources, are disposed.

The headlight drive 33 can turn on and turn off the light sources of the high beam unit 411 and the high beam unit 421, and can also control the light intensity when the light sources are turned on.

The light intensity adjustment apparatus 10 has, as functional components, a light-blocking target detection unit 21, an object detection unit 22, a visibility evaluation unit 23, and a light intensity adjustment unit 24. The visibility evaluation unit 23 has a coordinate conversion unit 231, an image extraction unit 232, a visibility calculation unit 233, and a brightness calculation unit 234. The functions of the functional components of the light intensity adjustment apparatus 10 are realized by software.

The storage 13 stores a program for realizing the functions of the functional components. This program is loaded into the memory 12 by the processor 11 and executed by the processor 11. In this way, the functions of the functional components are realized.

In FIG. 1, only one processor 11 is illustrated. However, the light intensity adjustment apparatus 10 may include a plurality of processors in place of the processor 11. These processors share execution of the program for realizing the functions of the functional components.

Description of Operation

The operation of the light intensity adjustment apparatus 10 according to the first embodiment will be described with reference to FIGS. 2 to 8.

The operation of the light intensity adjustment apparatus 10 according to the first embodiment corresponds to a light intensity adjustment method according to the first embodiment. The operation of the light intensity adjustment apparatus 10 according to the first embodiment also corresponds to processes of a light intensity adjustment program according to the first embodiment.

Figure 2:
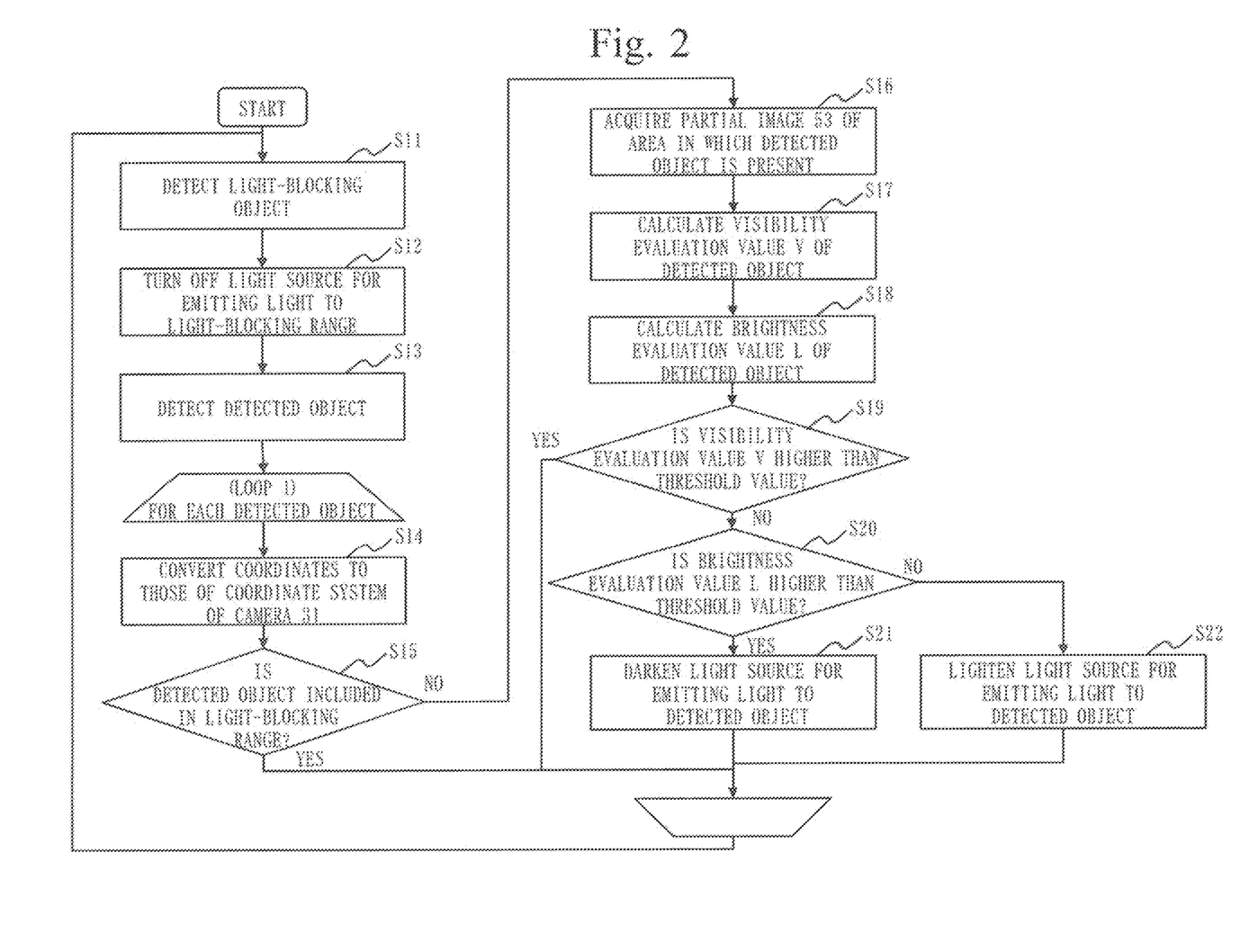
FIG. 2 is a flowchart illustrating the operation of the light intensity adjustment apparatus 10 according to the first embodiment.

(Step S11 of FIG. 2: Light-Blocking Object Detection Process)

The light-blocking target detection unit 21 detects a light-blocking object which is a target for which light-blocking is performed.

Specifically, the light-blocking target detection unit 21 acquires, via the communication interface 14, image data 51 ahead of the vehicle 100 acquired by the camera 31. The light-blocking target detection unit 21 performs an image recognition process using the image data 51 as input, so as to detect a nearby vehicle 200 present in the vicinity of the vehicle 100 as the light-blocking object. The light-blocking target detection unit 21 identifies a range including the light-blocking object as a light-blocking range. The light-blocking target detection unit 21 transmits range information indicating the light-blocking range to the visibility evaluation unit 23.

In the first embodiment, the light-blocking target detection unit 21 identifies an area having a luminance of a certain level or higher as a high-luminance area from the image data 51. The light-blocking target detection unit 21 detects a pair of high-luminance areas within a baseline angle of view as the headlamps of a nearby vehicle 200. In this way, the light-blocking target detection unit 21 detects an oncoming vehicle which is a nearby vehicle 200. Then, the light-blocking target detection unit 21 determines an area including the pair of high-luminance areas as the light-blocking range.

The light-blocking target detection unit 21 uses color information of the image data 51 to identify an area having the color of a tail lamp as a specified color area from the image data 51. The light-blocking target detection unit 21 detects a pair of specified color areas within the baseline angle of view as the tail lamps of a nearby vehicle 200. In this way, the light-blocking target detection unit 21 detects a preceding vehicle which is a nearby vehicle 200. Then, the light-blocking target detection unit 21 determines an area including the pair of specified color areas as the light-blocking range.

The light-blocking range is represented by coordinates (xL, yL) of the left edge of a left high-luminance area and coordinates (xR, yR) of the right edge of a right high-luminance area of the pair of high-luminance areas. Alternatively, the light-blocking range is represented by coordinates (xL, yL) of the left edge of a left specified color area and coordinates (xR, yR) of the right edge of a right specified color area of the pair of specified color areas. The light-blocking target detection unit 21 transmits the coordinates (xL, yL) of the left edge and the coordinates (xR, yR) of the right edge representing the light-blocking range to the visibility evaluation unit 23 and the light intensity adjustment unit 24.

(Step S12 of FIG. 2: Light-Blocking Process)

The light intensity adjustment unit 24 turns off, via the headlight drive 33, each light source for emitting light to the light-blocking range identified in step S11, among the plurality of light sources constituting the high beam unit 411 and the plurality of light sources constituting the high beam unit 421.

Figure 3:
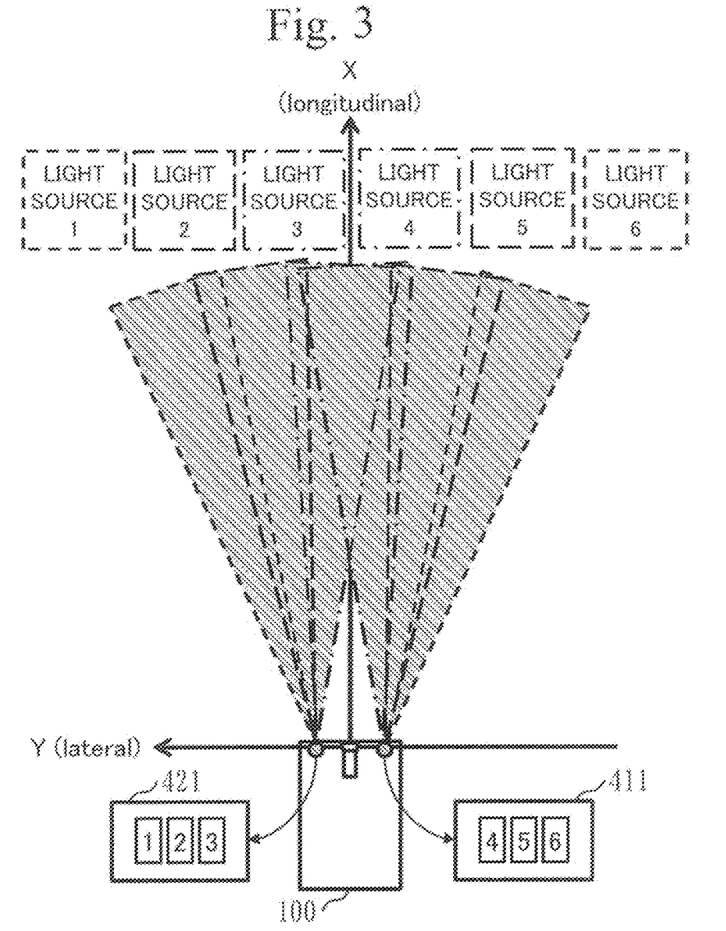
FIG. 3 is an explanatory diagram of a high beam unit 411 and a high beam unit 421 according to the first embodiment.
Figure 4:
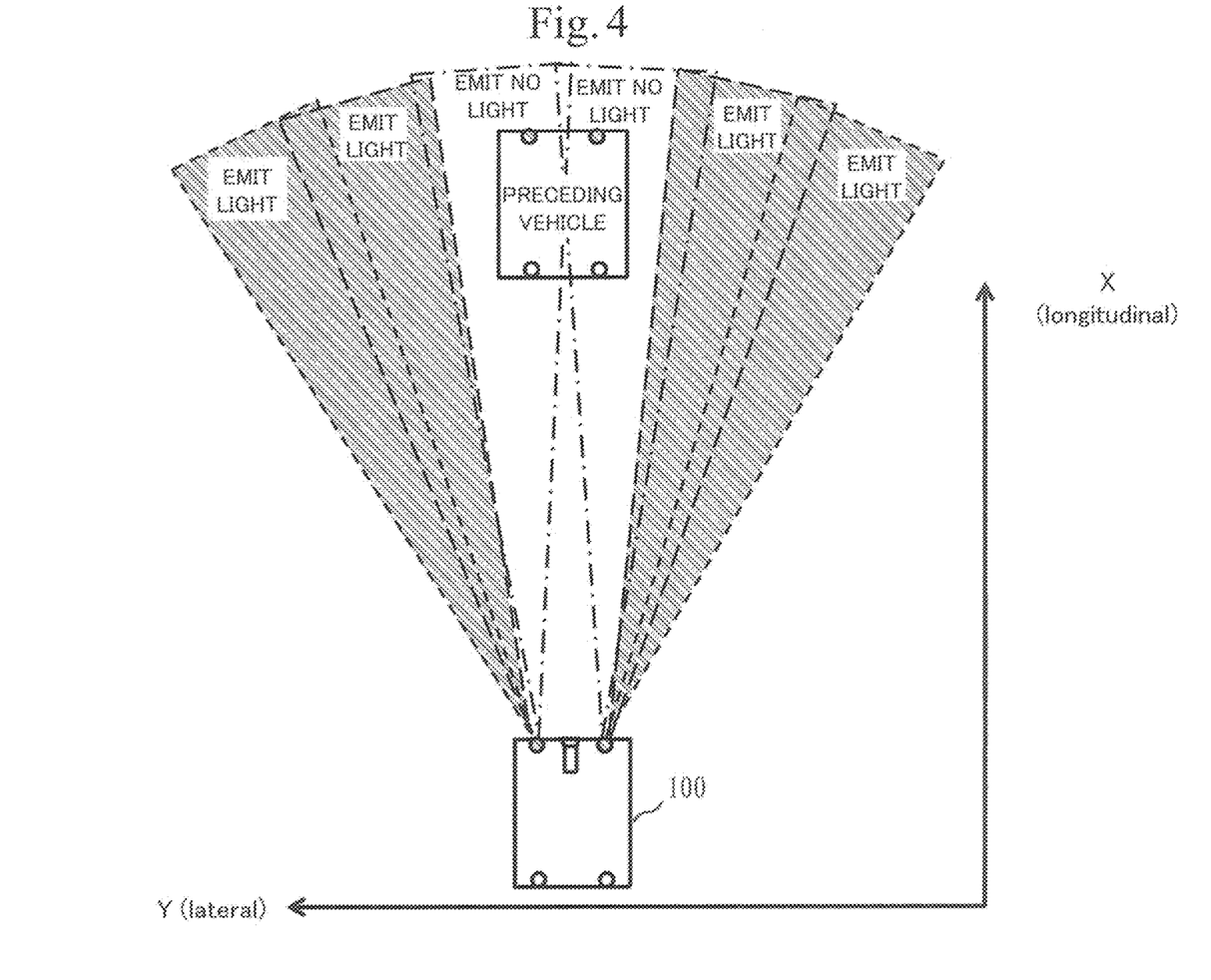
FIG. 4 is an explanatory diagram of a light-blocking process according to the first embodiment.

That is, as illustrated in FIG. 3, the plurality of light sources constituting the high beam unit 411 and the plurality of light sources constituting the high beam unit 421 are disposed such that an angle at which light is emitted is slightly different for each light source. Therefore, as illustrated in FIG. 4, the light intensity adjustment unit 24 turns off each light source for emitting light to the light-blocking range in which the light-blocking object is present. In FIG. 4, a preceding vehicle is illustrated as the light-blocking object. In this way, adjustment is made so that light is not emitted to the light-blocking object detected by the light-blocking target detection unit 21 in step S11.

(Step S13 of FIG. 2: Detected Object Detection Process)

The object detection unit 22 detects a three-dimensional object present ahead of the vehicle 100 as a detected object.

Figure 5:
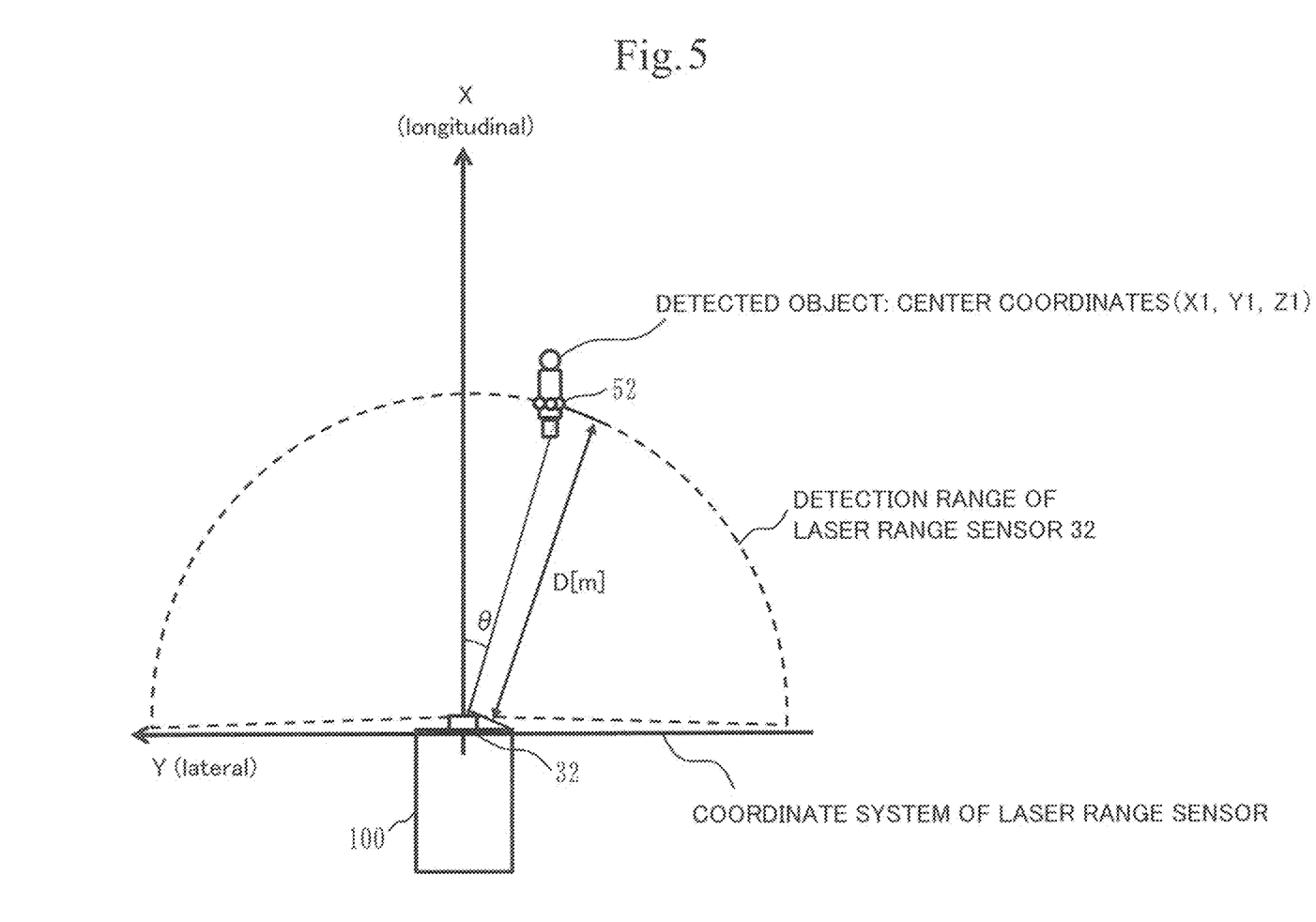
FIG. 5 is an explanatory diagram of a detected object detection process according to the first embodiment.

Specifically, as illustrated in FIG. 5, the object detection unit 22 acquires, via the communication interface 14, point cloud data 52 ahead of the vehicle 100 acquired by the laser range sensor 32. The point cloud data 52 indicates each reflection point at which light emitted from the laser range sensor 32 is reflected. From the point cloud data 52, the object detection unit 22 determines a distance D and an angle θ to each reflection point. The object detection unit 22 detects a plurality of reflection points within a baseline range as one detected object, based on the respective distances D and angles θ. The object detection unit 22 determines center coordinates (X1, Y1, Z1) and a size of each detected object. The size is determined in each of a horizontal direction, a vertical direction, and a depth direction. The object detection unit 22 transmits the center coordinates (X1, Y1, Z1) and the size of each detected object to the visibility evaluation unit 23 and the light intensity adjustment unit 24.

Processes of step S14 to step S22 are included in a loop 1 and are executed on each detected object detected in step S13.

(Step S14 of FIG. 2: Coordinate Conversion Process)

Figure 6:
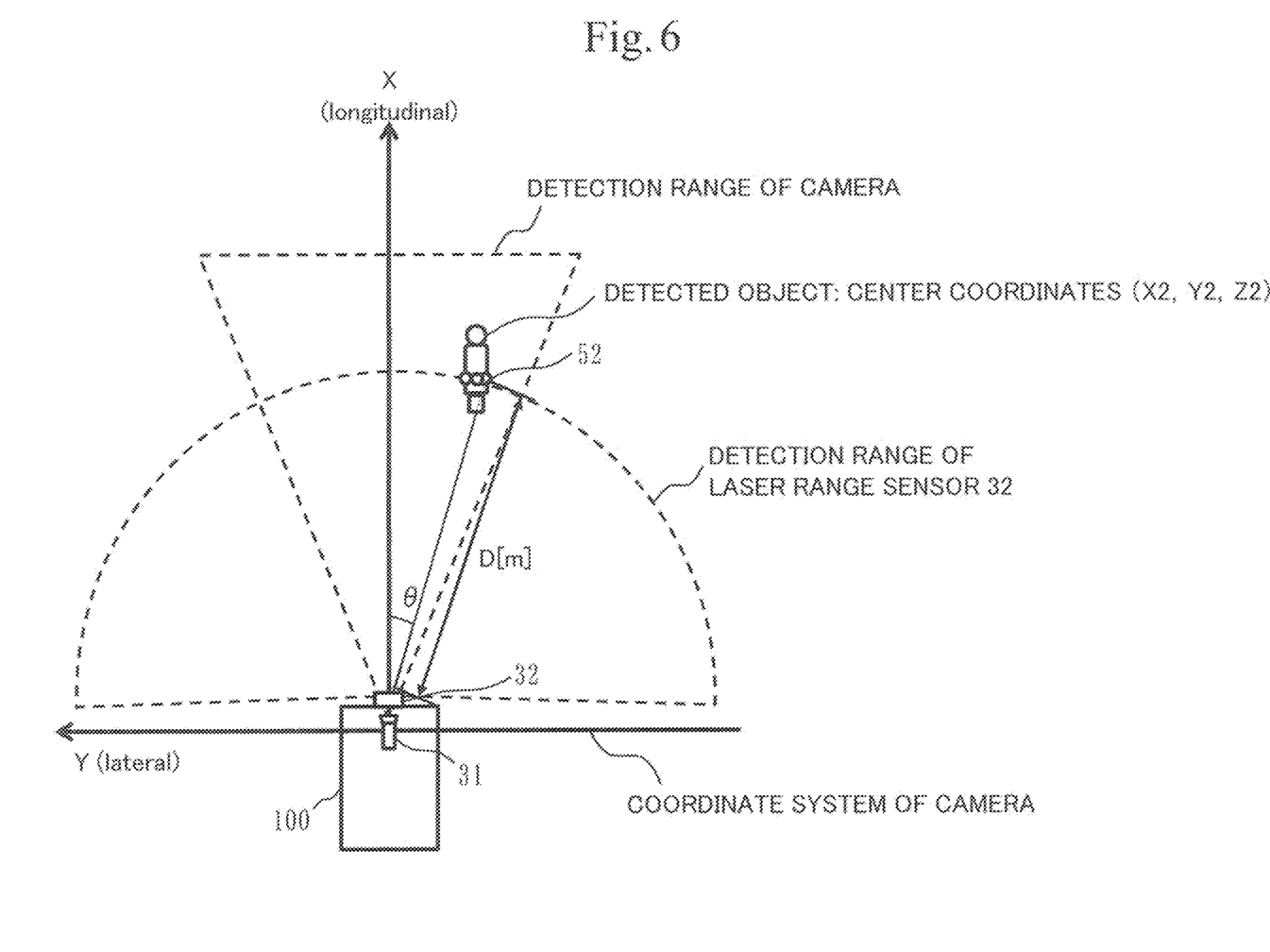
FIG. 6 is an explanatory diagram of a coordinate conversion process according to the first embodiment.

As illustrated in FIG. 6, the coordinate conversion unit 231 converts the center coordinates (X1, Y1, Z1) of a target detected object into coordinates (X2, Y2, Z2) of the coordinate system of the camera 31.

Specifically, the coordinate conversion unit 231 converts the center coordinates (X1, Y1, Z1) into the coordinates (X2, Y2, Z2) of the coordinate system of the camera 31 by a coordinate conversion formula indicated in Formula 1.

$$\begin{bmatrix} X_2 \\ Y_2 \\ Z_2 \\ 1 \end{bmatrix} = \qquad \text{[Formula 1]}$$

$$\begin{bmatrix} \cos\varphi\cos\theta & \cos\varphi\sin\theta\sin\Psi - \sin\varphi\cos\Psi & \cos\varphi\sin\theta\cos\Psi + \sin\varphi\sin\Psi & T_x \\ \sin\varphi\cos\theta & \sin\varphi\sin\theta\sin\Psi + \cos\theta\cos\varphi & \sin\varphi\sin\theta\cos\Psi - \cos\varphi\sin\Psi & T_y \\ -\sin\theta & \cos\theta\sin\Psi & \cos\theta\cos\varphi & T_z \\ 0 & 0 & 0 & 1 \end{bmatrix} \begin{bmatrix} X_1 \\ Y_1 \\ Z_1 \\ 1 \end{bmatrix}$$

In Formula 1, Tx, Ty, and Tz represent the amounts of movement from the center of the coordinate system of the camera 31 to the center of the coordinate system of the laser range sensor 32 in the x direction, y direction, and z direction, respectively. Note that φ, θ, and Ψ represent the amounts of rotation of roll, pitch, and yaw, respectively, of the coordinate system of the laser range sensor 32 with respect to the center of the coordinate system of the camera 31.

The coordinate conversion unit 231 calculates, for the target detected object, a pixel position (u1, v1) at which the coordinates (X2, Y2, Z2) in the coordinate system of the camera 31 are projected on an imaging plane of the camera 31.

Specifically, the coordinate conversion unit 231 calculates the pixel position (u1, v1) at which the coordinates (X2, Y2, Z2) are projected by a perspective projection conversion formula indicated in Formula 2.

$$\begin{bmatrix} u_1 \\ v_1 \\ 1 \end{bmatrix} = \begin{bmatrix} f_x & 0 & 0 \\ 0 & f_y & 0 \\ 0 & 0 & 1 \end{bmatrix} \begin{bmatrix} X_2 \\ Y_2 \\ Z_2 \\ 1 \end{bmatrix} \qquad \text{[Formula 2]}$$

In Formula 2, fx and fy represent focal lengths in pixel units which are used as camera parameters. The pixel position (u1, v1) represents a pixel position when the center of the imaging plane of the camera 31 is the origin position (0, 0). The center of the imaging plane of the camera 31 is the center position of the image data 51.

(Step S15 of FIG. 2: Area Determination Process)

The coordinate conversion unit 231 determines whether the target detected object is included in the light-blocking range identified in step S11.

Specifically, the coordinate conversion unit 231 determines whether the pixel position (u1, v1) of the target detected object calculated in step S14 is within the light-blocking range. The coordinate conversion unit 231 also determines whether more than a baseline percentage of the target detected object is included in the light-blocking range, based on the size of the target detected object determined in step S14. If the pixel position (u1, v1) is within the light-blocking range and more than the baseline percentage of the target detected object is included in the light-blocking range, the coordinate conversion unit 231 determines that the target detected object is included in the light-blocking range.

If it is determined that the target detected object is included in the light-blocking range, the coordinate conversion unit 231 advances the process to the end of the loop 1. On the other hand, if it is determined that the target detected object is not included in the light-blocking range, the coordinate conversion unit 231 advances the process to step S16.

(Step S16 of FIG. 2: Image Acquisition Process)

The image extraction unit 232 acquires a partial image 53 of an area in which the target detected object is present.

Specifically, the image extraction unit 232 acquires, via the communication interface 14, the image data 51 ahead of the vehicle 100 acquired by the camera 31. The image extraction unit 232 extracts, from the image data 51, data being centered on the pixel position (u1, v1) and having the size of the target detected object as the partial image 53.

(Step S17 of FIG. 2: Visibility Calculation Process)

The visibility calculation unit 233 calculates a visibility evaluation value V resulting from evaluation of the visibility of the target detected object, based on the partial image 53 acquired in step S16. That is, the visibility calculation unit 233 calculates the visibility evaluation value V resulting from evaluation of the visibility of the target detected object, based on the image data obtained by the visible light sensor. The visibility calculation unit 233 transmits the visibility evaluation value V to the light intensity adjustment unit 24.

Figure 7:
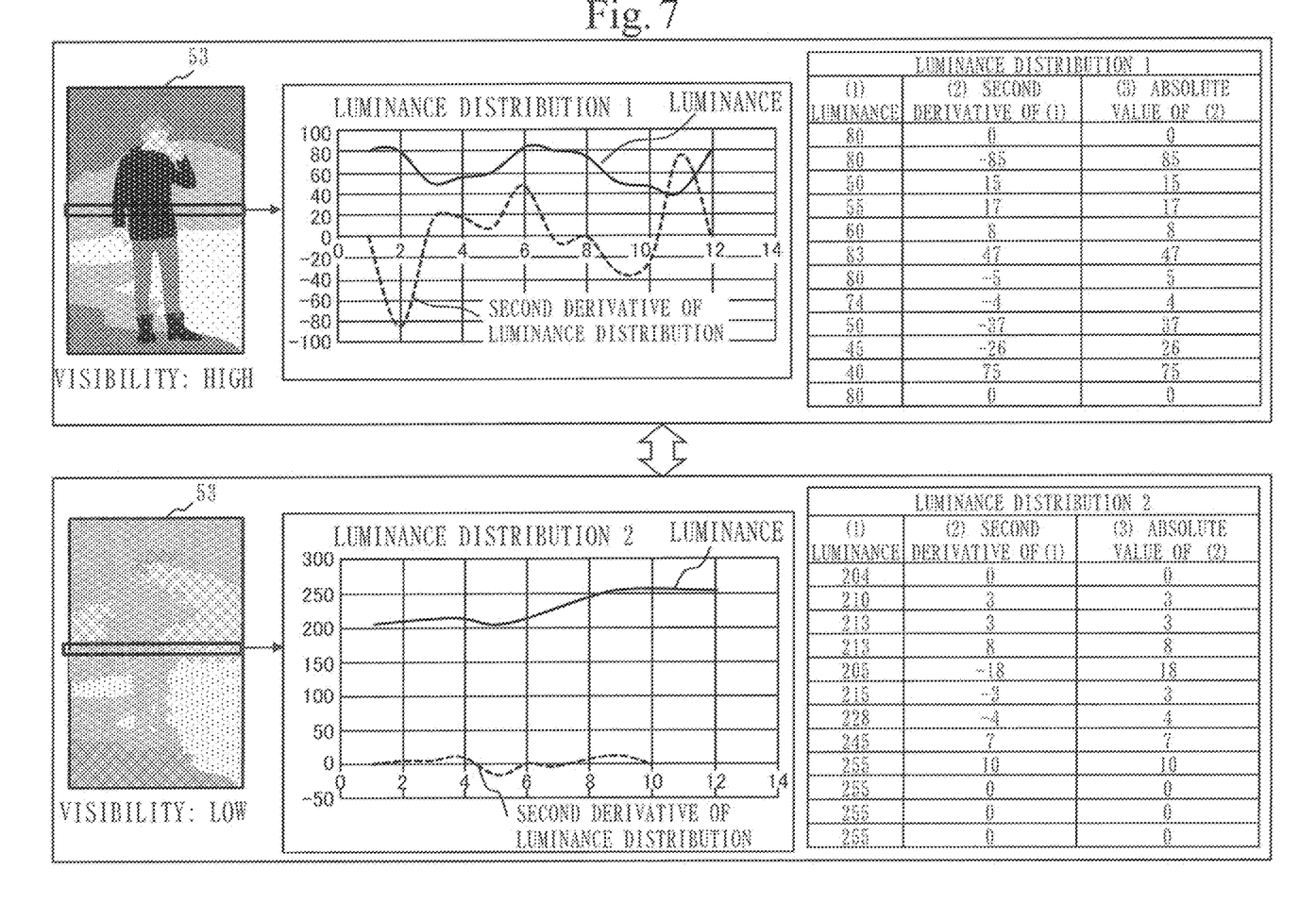
FIG. 7 is an explanatory diagram of a visibility calculation process according to the first embodiment.

Specifically, as illustrated in FIG. 7, the visibility calculation unit 233 extracts data of one horizontal line at the center in a height direction of the partial image 53. The visibility calculation unit 233 calculates, as the visibility evaluation value V, the sum of absolute values of values obtained by performing smoothing and then performing second derivative calculations on the luminances of pixels of the one line. The visibility calculation unit 233 can perform data smoothing using, for example, a moving average filter or a Gaussian filter.

The visibility evaluation value V calculated in this way will result in a lower value in a case where the luminances of consecutive pixels are constant at a high value due to luminance saturation or the like, and a case where the luminances of consecutive pixels are constant at a low level, compared with other cases. The case where the luminances of consecutive pixels are constant at a high value due to luminance saturation or the like, and the case where the luminances of consecutive pixels are constant at a low level are states in which the texture is unclear and visual recognition is difficult.

The visibility evaluation value V is calculated using only data on one line at the center in the height direction herein. However, the visibility evaluation value V may be calculated using data on a plurality of lines in the height direction. That is, the sum of absolute values of values obtained by performing smoothing and then performing second derivative calculations on data on a plurality of lines may be used as the visibility evaluation value V.

(Step S18 of FIG. 2: Brightness Calculation Process)

The brightness calculation unit 234 calculates a brightness evaluation value L resulting from evaluation of the brightness of the target detected object, based on the partial image 53 acquired in step S16. Specifically, the brightness calculation unit 234 calculates the average value of the luminances of the pixels of the partial image 53 as the brightness evaluation value L. The brightness calculation unit 234 transmits the brightness evaluation value L to the light intensity adjustment unit 24.

(Step S19 of FIG. 2: Visibility Determination Process)

The light intensity adjustment unit 24 compares a visibility threshold value determined in accordance with the distance to the detected object with the visibility evaluation value V calculated in step S17, so as to determine whether or not the light intensity is to be adjusted.

Figure 8:
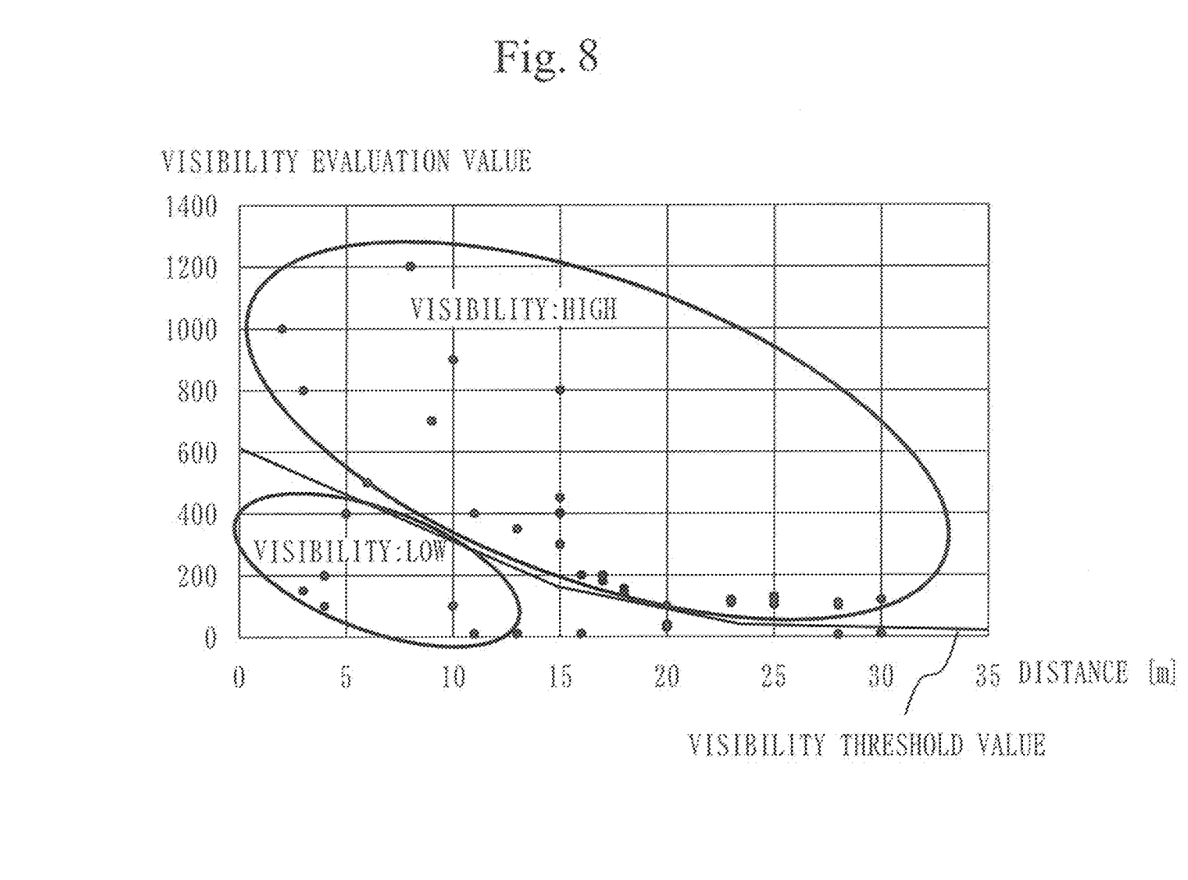
FIG. 8 is an explanatory diagram of a visibility determination process according to the first embodiment.

Specifically, if the visibility evaluation value V is higher than the visibility threshold value corresponding to the distance to the target detected object, the light intensity adjustment unit 24 determines that the visibility is high, and if not, determines that the visibility is low. Note here that the closer the distance, the larger the target detected object and the larger the number of pixels in the horizontal direction. On the other hand, the farther the distance, the smaller the target detected object and the smaller the number of pixels in the horizontal direction. Therefore, as illustrated in FIG. 8, the light intensity adjustment unit 24 uses a smaller visibility threshold value as the distance to the detected object becomes longer.

If it is determined that the visibility is high, the light intensity adjustment unit 24 advances the process to the end of the loop 1. On the other hand, if it is determined that the visibility is low, the light intensity adjustment unit 24 advances the process to step S20.

(Step S20 of FIG. 2: Brightness Determination Process)

The light intensity adjustment unit 24 determines whether the brightness evaluation value L calculated in step S18 is higher than a brightness threshold value. The brightness threshold value is a value empirically determined in accordance with whether or not visual recognition is easy.

If it is determined that the brightness evaluation value L is higher than the brightness threshold value, the light intensity adjustment unit 24 advances the process to step S21. On the other hand, if it is determined that the brightness evaluation value L is less than or equal to the brightness threshold value, the light intensity adjustment unit 24 advances the process to step S22.

(Step S21 of FIG. 2: Light Intensity Decrement Process)

The light intensity adjustment unit 24 decrements, via the headlight drive 33, the light intensity of each light source for emitting light to the area of the target detected object by one level, among the plurality of light sources constituting the high beam unit 411 and the plurality of light sources constituting the high beam unit 421. For example, the light intensity adjustment unit 24 lowers the luminance of each light source for emitting light to the area of the target detected object by 1 [cd].

(Step S22 of FIG. 2: Light Intensity Increment Process)

The light intensity adjustment unit 24 increments, via the headlight drive 33, the light intensity of each light source for emitting light to the area of the target detected object by one level, among the plurality of light sources constituting the high beam unit 411 and the plurality of light sources constituting the high beam unit 421. For example, the light intensity adjustment unit 24 increases the luminance of each light source for emitting light to the area of the target detected object by 1 [cd].

Note that the plurality of light sources constituting the high beam unit 411 have overlapped portions in the respective light emitting ranges, as illustrated in FIG. 3. Similarly, the plurality of light sources constituting the high beam unit 421 have overlapped portions in the respective light emitting ranges. When the light intensity is controlled in step S21 or step S22, the headlight drive 33 controls each light source so that the intensity of light emitted to the specified area becomes the value as specified, in consideration of the overlapping portions of the light emitting ranges of the respective light sources.

After the above processes are performed, the processes are performed again from step S11. In this way, by repeatedly executing the processes illustrated in FIG. 2, the visibility of the area ahead of the vehicle 100 is adjusted to the desired state.

Effects of First Embodiment

As described above, the light intensity adjustment apparatus 10 according to the first embodiment calculates, based on the image data 51, the visibility evaluation value V for a detected object detected by the laser range sensor 32. Then, the light intensity adjustment apparatus 10 according to the first embodiment adjusts the light intensity of the headlights 40 for illuminating the area in which the detected object is present. In this way, the reduction of visibility of an object present ahead of the vehicle 100 can be prevented.

That is, even an object, detection of which is difficult with the visible light sensor, can be detected with the non-visible light sensor, so that a reduction in luminance and luminance saturation can be eliminated in the area where the object is present, thereby enhancing the visibility.

In particular, the light intensity adjustment apparatus 10 according to the first embodiment adjusts the light intensity of the headlights 40 in accordance with the visibility evaluation value V and the distance to a detected object. In this way, whether or not the visibility of the detected object is sufficient can be determined appropriately.

Further, the light intensity adjustment apparatus 10 according to the first embodiment adjusts the light intensity of the headlights 40, based on the brightness evaluation value L. In this way, the light intensity can be adjusted appropriately. For example, when light is emitted to the detected object by the headlights of a nearby vehicle 200, it is possible to perform control such as reducing the light intensity of the headlights 40 of the vehicle 100.

Other Configurations

<First Variation>

In the first embodiment, the visibility of a detected object detected by the laser range sensor 32 is increased. As a first variation, a specific object such as a road sign may be detected based on the image data 51. Then, the visibility may also be increased for the object detected based on the image data 51 as in the case of the detected object detected by the laser range sensor 32.

<Second Variation>

In the first embodiment, a nearby vehicle 200 is detected based on the image data 51. As a second variation, a nearby vehicle 200 may be detected based on received data received from an external device such as the nearby vehicle 200 or a roadside device present in the vicinity of the vehicle 100.

<Third Variation>

In the first embodiment, the laser range sensor 32 is used as the non-visible light sensor. As a third variation, a millimeter wave radar, a sonar, or the like may be used as the non-visible light sensor. Instead of point cloud data acquired by the laser range sensor 32, received data received from an external device such as a nearby vehicle 200 or a roadside device present in the vicinity of the vehicle 100 may be used.

<Fourth Variation>

In the first embodiment, the high beam unit 411 and the high beam unit 421 are controlled. As a fourth variation, the low beam unit 412 and the low beam unit 422 may also be controlled similarly to the high beam unit 411 and the high beam unit 421. In this case, each of the low beam unit 412 and the low beam unit 422 also needs to be an array light source in which a plurality of light sources, such as LCD light sources, are disposed.

<Fifth Variation>

In the first embodiment, the sum of absolute values of values obtained by performing smoothing and then performing second derivative calculations on the luminances of pixels of one line or a plurality of lines is used as the visibility evaluation value V. As a fifth variation, the edge strength of the partial image 53 may be used as the visibility evaluation value V. Alternatively, the likelihood obtained by a process for identification of a detected object using the histogram of oriented gradients (HOG) of the partial image 53 may be used as the visibility evaluation value V. Alternatively, the visibility evaluation value V may be calculated by combining two or more of the sum of absolute values of values obtained by second derivative calculations, the edge strength, and the likelihood of the identification process.

<Sixth Variation>

In the first embodiment, the functional components are realized by software. As a sixth variation, however, the functional components may be realized by hardware. Differences in the sixth variation from the first embodiment will be described.

Figure 9:
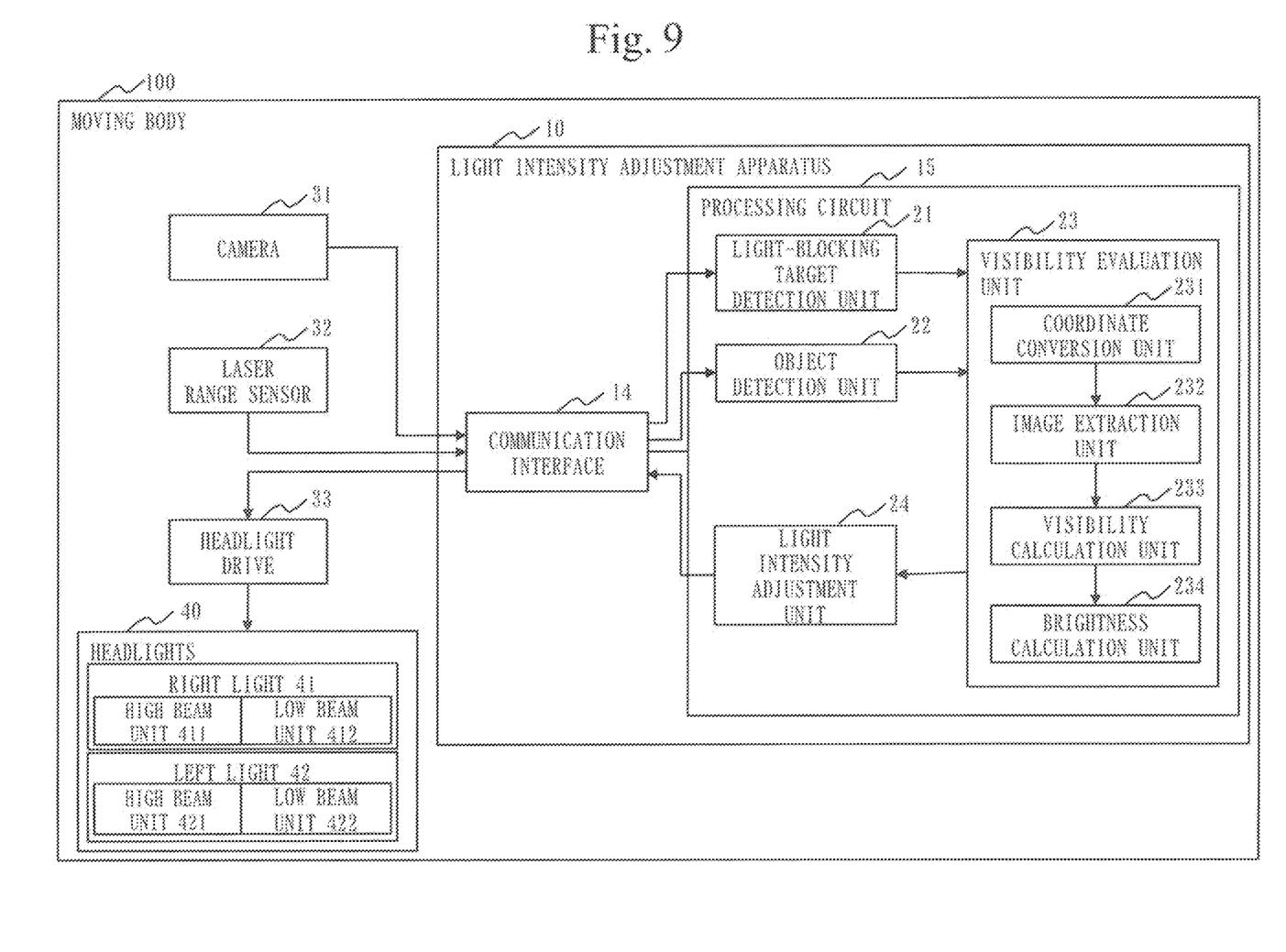
FIG. 9 is a configuration diagram of a light intensity adjustment apparatus 10 according to a sixth variation.

A configuration of a light intensity adjustment apparatus 10 according to the sixth variation will be described with reference to FIG. 9.

When the functional components are realized by hardware, the light intensity adjustment apparatus 10 has a processing circuit 15 in place of the processor 11, the memory 12, and the storage 13. The processing circuit 15 is a dedicated electronic circuit that realizes the functions of the functional components, the memory 12, and the storage 13.

The processing circuit 15 is assumed to be a single circuit, a composite circuit, a programmed processor, a parallel programmed processor, a logic IC, a gate array (GA), an application-specific integrated circuit (ASIC), or a field-programmable gate array (FPGA).

The functional components may be realized by one processing circuit 15, or the functional components may be realized by being distributed among a plurality of processing circuits 15.

<Seventh Variation>

As a seventh variation, some of the functional components may be realized by hardware, and the rest of the functional components may be realized by software.

The processor 11, the memory 12, the storage 13, and the processing circuit 15 are referred to collectively as "processing circuitry". That is, the functions of the functional components are realized by the processing circuitry.

REFERENCE SIGNS LIST

10: light intensity adjustment apparatus, 11: processor, 12: memory, 13: storage, 14: communication interface, 15: processing circuit, 21: light-blocking target detection unit, 22: object detection unit, 23: visibility evaluation unit, 231: coordinate conversion unit, 232: image extraction unit, 233: visibility calculation unit, 234: brightness calculation unit, 24: light intensity adjustment unit, 31: camera, 32: laser range sensor, 33: headlight drive, 40: headlights, 41: right light, 411: high beam unit, 412: low beam unit, 42: left light, 421: high beam unit, 422: low beam unit, 51: image data, 52: point cloud data, 53: partial image, 100: vehicle, 101: moving body

The invention claimed is:

1. A light intensity adjustment apparatus comprising:
processing circuitry to:
calculate, for a detected object ahead of a moving body detected by a non-visible light sensor, a sum of absolute values of values obtained by performing a second derivative calculation on a luminance, which is obtained from image data obtained by a visible light sensor, of each pixel constituting one or more horizontal lines of an area in which the detected object is present, as a visibility evaluation value resulting from evaluation of visibility; and adjust a light intensity of a headlight of the moving body for illuminating the area in which the detected object is present, in accordance with the calculated visibility evaluation value.

2. The light intensity adjustment apparatus according to claim 1,
wherein the processing circuitry adjusts the light intensity in accordance with the visibility evaluation value and a distance to the detected object.

3. The light intensity adjustment apparatus according to claim 2,
wherein the processing circuitry compares a visibility threshold value determined in accordance with the distance to the detected object with the visibility evaluation value, so as to determine whether or not the light intensity is to be adjusted.

4. The light intensity adjustment apparatus according to claim 1,
wherein the processing circuitry calculates a brightness evaluation value resulting from evaluation of brightness of the area in which the detected object is present, based on the image data, and
lowers the light intensity when the brightness evaluation value is higher than the brightness threshold value, and increases the light intensity when the brightness evaluation value is lower than or equal to the brightness threshold value.

5. The light intensity adjustment apparatus according to claim 1,
wherein the processing circuitry calculates the visibility evaluation value, using a road sign detected based on an image obtained by the visible light sensor as the detected object.

6. The light intensity adjustment apparatus according to claim 1,
wherein the processing circuitry detects a light-blocking object which is a target for which light-blocking is performed, and
performs adjustment such that light is not emitted to the detected light-blocking object.

7. The light intensity adjustment apparatus according to claim 6,
wherein the processing circuitry detects the light-blocking object, based on at least one of the image data and received data received from an external device present in a vicinity of the moving body.

8. A light intensity adjustment method comprising:
calculating, for a detected object ahead of a moving body detected by a non-visible light sensor, a sum of absolute values of values obtained by performing a second derivative calculation on a luminance, which is obtained from image data obtained by a visible light sensor, of each pixel constituting one or more horizontal lines of an area in which the detected object is present, as a visibility evaluation value resulting from evaluation of visibility; and
adjusting a light intensity of a headlight of the moving body for illuminating the area in which the detected object is present, in accordance with the visibility evaluation value.

9. A non-transitory computer readable medium storing a light intensity adjustment program for causing a computer to execute:
a visibility evaluation process to calculate, for a detected object ahead of a moving body detected by a non-visible light sensor, a sum of absolute values of values obtained by performing a second derivative calculation on a luminance, which is obtained from image data obtained by a visible light sensor, of each pixel constituting one or more horizontal lines of an area in which the detected object is present, as a visibility evaluation value resulting from evaluation of visibility; and
a light intensity adjustment process to adjust a light intensity of a headlight of the moving body for illuminating the area in which the detected object is present, in accordance with the visibility evaluation value calculated by the visibility evaluation process.

* * * * *